Oct. 16, 1956 P. G. PATER ET AL 2,766,825
HYDRAULIC WORK CLAMP FOR SQUARING SHEARS
Filed July 13, 1955 3 Sheets-Sheet 1

INVENTORS
Paul G. Pater
Kenneth E. Wagner
Howard R. Maire
BY Murray, Sackhoff & Murray
ATT'YS INVENTORS
Paul G. Pater
Kenneth E. Wagner
Howard R. Matre
BY Murray, Sachhoff + Murray
ATT'YS Oct. 16, 1956 P. G. PATER ET AL 2,766,825
HYDRAULIC WORK CLAMP FOR SQUARING SHEARS
Filed July 13, 1955 3 Sheets-Sheet 3

INVENTORS
Paul G. Pater
Kenneth E. Wagner
Howard R. Matre
BY Murray, Sackhoff + Murray
ATT'YS

United States Patent Office 2,766,825
Patented Oct. 16, 1956

2,766,825

HYDRAULIC WORK CLAMP FOR SQUARING SHEARS

Paul G. Pater, Hamilton, Kenneth E. Wagner, Cincinnati, and Howard R. Matre, Hamilton, Ohio, assignors to The Lodge and Shipley Company—The Hamilton Division, Hamilton, Ohio, a corporation of Ohio Application July 13, 1955, Serial No. 521,679

11 Claims. (Cl. 164—52)

The present invention relates to squaring shears and is particularly directed to an hydraulic work clamp for said shears and to the system for actuating the clamp.

It is common in the design of squaring shears to provide an hydraulic work clamp actuated by a pump that is mechanically driven from a moving part of the squaring shear ram drive. As the work must be clamped before the shearing operation the actuation of the work clamp was restricted to a short initial phase of the ram operating cycle and as the feed stroke of the hold down devices were relatively long their feed strokes were necessarily at a fast rate of movement resulting in impact shock of the devices on the work just prior to the time of work clamping action. This was not objectionable when relatively hard metal work sheets were cut on the squaring shears but when soft metal such as aluminum was to be cut thereon the impact shock of the hold down devices created objectionable marks and indentations on the surface of the finished work.

According to the present invention there is provided a hold down actuating fluid pressure system whose operation is entirely independent of the drive for the squaring shear ram, said system including automatic means for movement of the ram only after the work hold down has been fully operated and in full work clamping condition.

Another object of the invention is to provide a work hold down device for shears wherein the feeding speed and hold down pressure of the clamping fingers are held within certain limits calculated to preclude marring of the surfaces of soft materials to be cut on the shears.

A further object of this invention is to provide an apparatus of the aforedescribed character of extremely simple construction which is positive in its action and which will automatically control both the feeding speed and clamping pressure of the work hold down fingers once the apparatus is put in operation by a manual control.

Still a further object of the invention is to provide a novel pneumatically operated hydraulic pump for carrying out the foregoing objectives.

Numerous other objects and advantages of this invention will become apparent from the following description, reference being had to the accompanying drawings which illustrate a presently preferred embodiment of the invention, and wherein.

Figure 1:
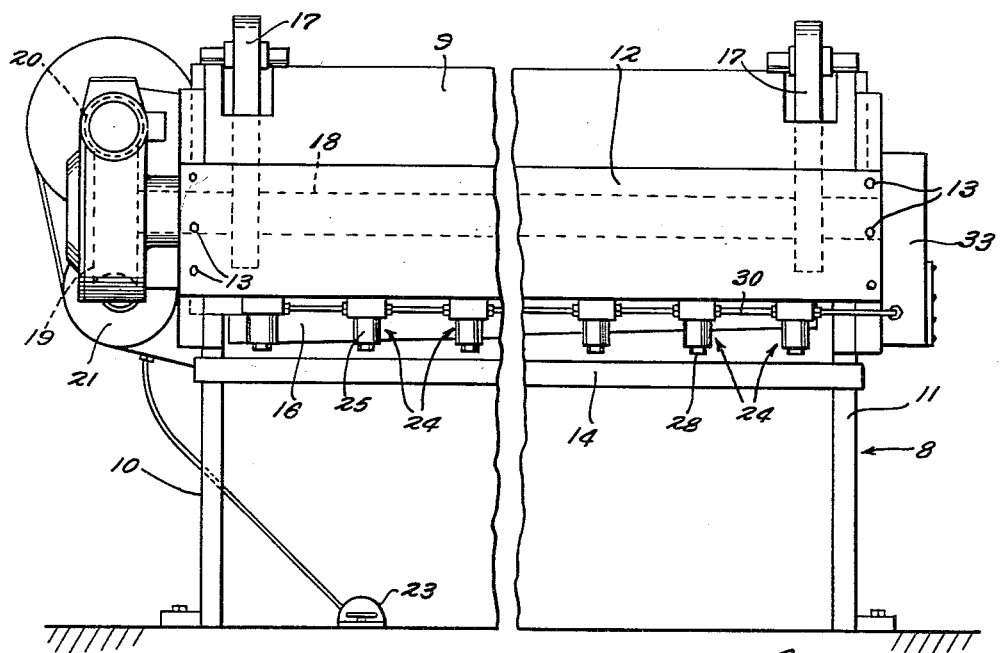
Fig. 1 is a fragmental front elevational view of a typical squaring shear utilizing the work clamp mechanism and system of this invention.
Figure 2:
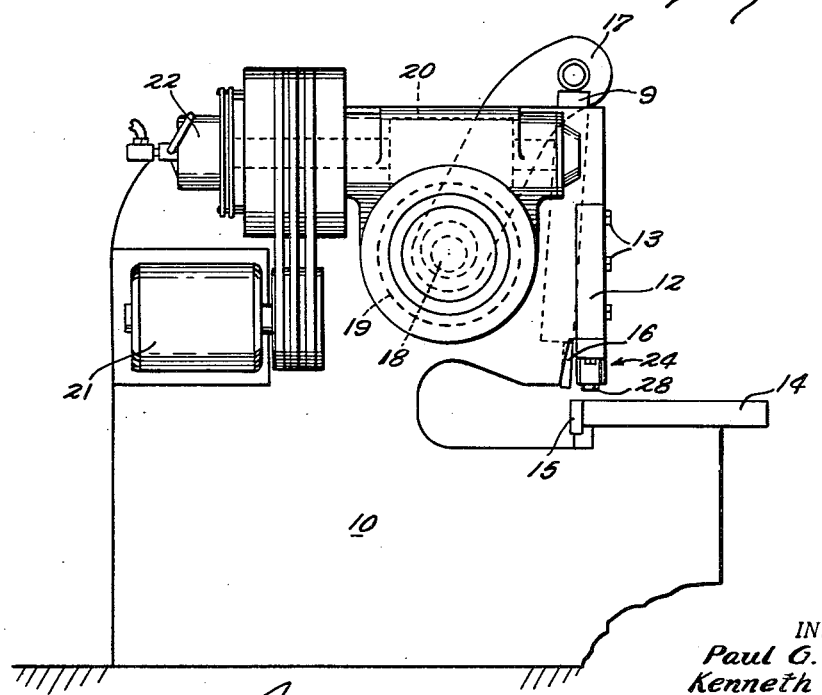
Fig. 2 is a side elevational view of the shear illustrated in Fig. 1.

Referring to the drawings wherein like characters of reference designate like parts throughout the several views, 8 indicates the frame of a conventional squaring shear, said frame having a ram 9 mounted thereon for vertical reciprocated movement between opposed side housings 10 and 11 and behind a fixed front plate 12 that is secured to the housings by bolts 13. A work supporting bed plate 14 is also positioned upon the housings 10 and 11 and has secured to its rearward end a stationary knife blade 15 which cooperates with the shear knife blade 16 movably mounted on the lower end of the ram 9. The ram is reciprocated by pitmans 17—17 connected to an eccentric shaft 18 that is journaled in the housings 10 and 11, said shaft having a gear 19 fixed thereto which meshes with a worm 20. The worm is driven by an electric motor 21 mounted on the housing 10 through a pneumatic clutch arrangement generally indicated at 22 which is electrically controlled by a foot switch 23. Thus when the pneumatic clutch 22 is operative the electric motor 21 will reciprocate the ram 9 to bring the shear knives 15 and 16 into cutting relation and return to shear a piece of work held upon the bed plate 14.

Figure 3:
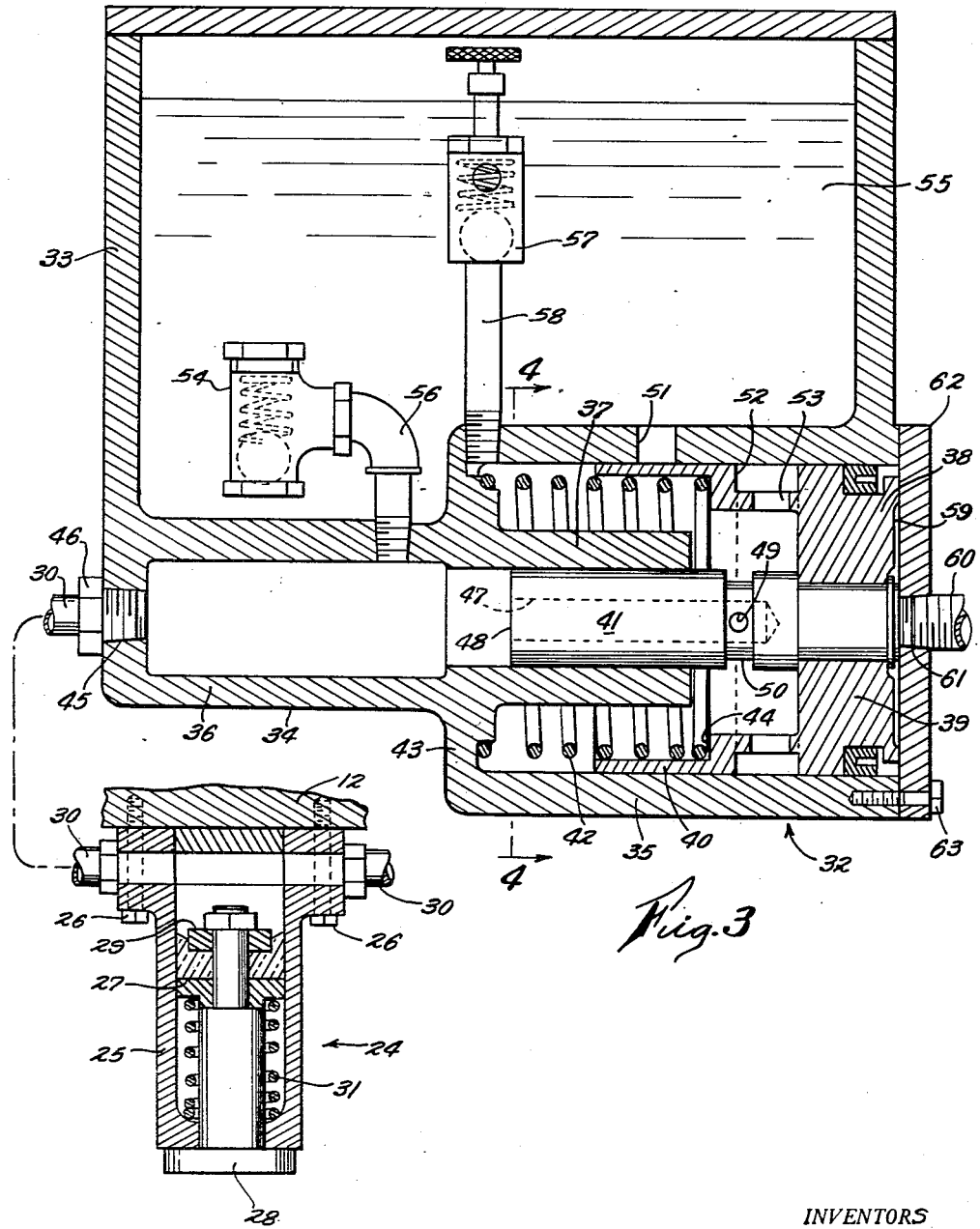
Fig. 3 is an enlarged section taken through the pneumatically operated pump for the hydraulic work clamping system of this invention.
Figure 4:
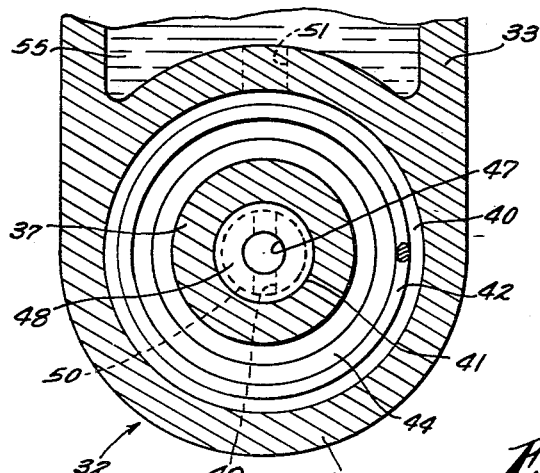
Fig. 4 is a section taken on line 4—4 of Fig. 3.

A row of laterally spaced apart, hydraulically actuated hold down devices 24 is mounted on and depend from the fixed front plate 12 for clamping work to be operated on by the squaring shears. As best shown in Fig. 3 of the drawings each hold down device 24 comprises a vertical cylinder 25 secured by bolts 26 to the plate 12 and housing a piston 27 which slides therein, and which is connected to a work contacting finger 28 projecting through the open bottom of the cylinder 25. Fluid under pressure is introduced into the actuating side 29 of each piston from a fluid pressure line 30 that is common to all the hold down devices. An expansile spring 31 surrounding the finger 28 is adapted to return the finger to normal inoperative position in the absence of a counteracting pressure in the common fluid supply line 30. It will therefore be understood that the row of work hold downs 24 are single acting, piston-cylinder devices which will feed the associated fingers 28 toward the work supported on the bed plate 14 when fluid pressure great enough to overcome all the springs 31 is introduced into the supply line 30 and that said fingers will be placed under clamping action with said work when a relatively higher head of pressure is caused to exist in the said supply line, the fingers being returned to inoperative positions by the springs 31 when the pressure in the supply line drops below the pressure exerted by their combined effects.

With reference to Fig. 3 of the drawings a fluid pump generally indicated by the reference numeral 32 is preferably housed in a casing 33 shown as mounted on the shear frame housing 11. This pump is a single acting master cylinder assembly for supplying fluid under pressure to the supply line 30 of the work hold down devices and comprises a first chamber wall 34 and a coaxially positioned second chamber wall 35 preferably cast in and made integral with the casing 33. The first chamber wall has a portion 36 projecting from one end of the second chamber wall 35 and has its opposite end portion 37 extending into the central part of the chamber formed by the wall 35. A piston 38 is slidable within the second chamber wall 35 and itself comprises a lateral head portion 39 and an annular skirt 40 extending from one side of the head portion. A plunger 41 is fixed on the piston head coaxially with the skirt portion and extends into and is slidable within the first chamber wall 34, the plunger and piston being biased toward the inoperative positions shown in Fig. 3 by an expansile spring 42 surrounding the portion 37 of the first chamber and bearing at one end against a lateral wall 43 of the master cylinder and at its other end against an annular shoulder 44 formed around the internal wall of the skirt portion 40 of the piston.

Conduit means such as a threaded opening 45 in the first chamber wall 34 and an associated coupling 46 connects the first chamber of the master cylinder with the pressure supply line 30 for the hold down devices, whilst the second chamber thereof is normally interconnected with the first chamber by means of a longitudinal passageway 47 in open communication with the first chamber through the pressure creating surface 48 of the plunger, the opposed end of the passageway 47 being connected to a diametrically extending passageway 49 formed in the plunger and which opens out into an annular groove 50 formed in the periphery of an intermediate part of the plunger that is normally located within the second chamber.

A pressure relief means is provided for the second chamber and comprises a stationary port 51 formed in the chamber wall 35 which is normally covered by the piston skirt portion 40 and out of registry with an annular groove 52 formed in a part of said skirt portion adjacent the head portion 39, a number of lateral holes 53 being formed in the skirt to connect the said groove with the interior of the second chamber. The reference numeral 54 represents a ball check valve immersed in oil 55 contained in the bottom of the casing 33 and communicating with the first chamber by a pipe 56, said valve being adapted to preclude passage of pressure fluid from the said chamber but admitting fluid to the chamber from the reservoir to automatically replenish the hold down system when that becomes necessary through loss of oil from the system due to leakage, or the like. A pressure relief valve 57 also immersed in oil 55 is connected to the second chamber by pipe 58, said valve being set to relieve the fluid pressure in the second chamber in the event it would exceed a predetermined maximum.

Power means for actuating the piston 38 takes the form of a source of fluid pressure introduced to the power side 59 of the piston through a fluid pressure pipe 60 threaded in a tapped opening 61 formed in a cover plate 62 secured by bolts 63 to the casing.

Figure 5:
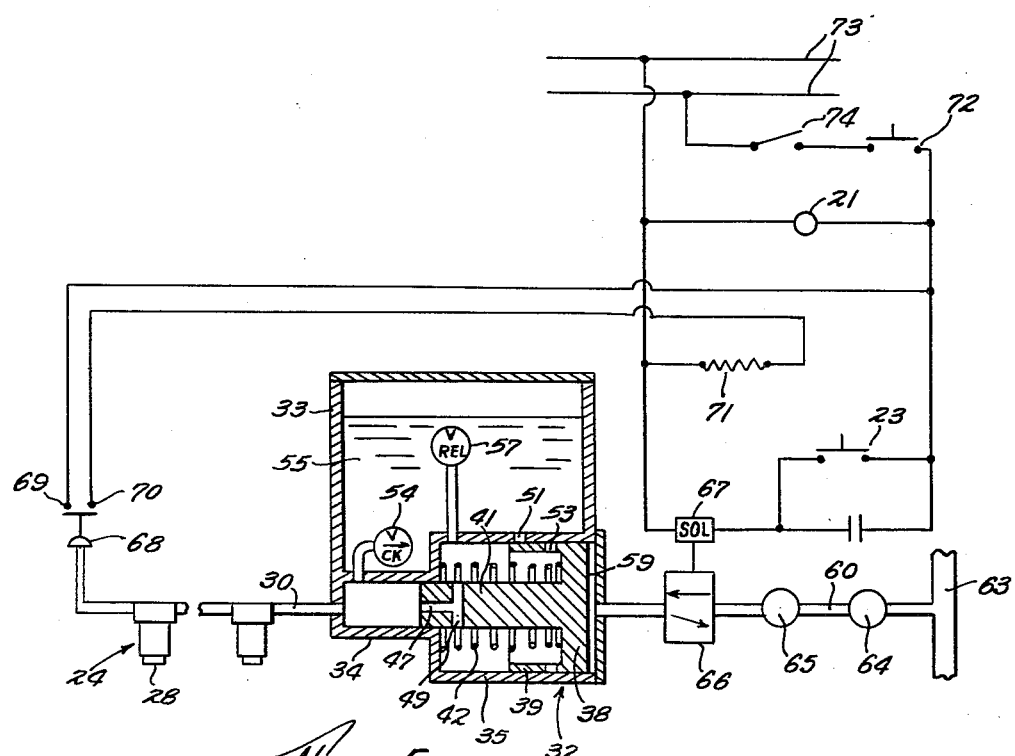
Fig. 5 is a diagrammatic view of the work hold down system.

With reference to Fig. 5 which schematically illustrates the system for operating the hydraulic work clamp described hereinbefore the fluid pressure pipe 60 may be connected to a source of pneumatic pressure in a factory line 63, said pipe 60 having interposed therein a pressure regulating valve 64, a volume control valve 65 and a control valve 66 operated by an electric solenoid 67. The supply line 30 has a pressure switch 68 connected therein which is set to bridge the electric contacts 69 and 70 when a predetermined maximum pressure occurs in the said supply line 30. The contacts are in the electric circuit for controlling the pneumatic clutch 22, said circuit including a clutch air valve coil 71.

*Operation*

In the operation of the system and with particular reference to Fig. 5 it will be noted that the squaring shears are put in condition for operation by closing a switch 72 which connects the electric motor 21 with electric power supply lines 73. Work to be cut on the shears is then placed on the bed 14 in the proper position thereon whereupon the foot switch 23 is actuated to energize the solenoid 67 which in turn operates the valve 66 to admit pressure fluid from the source 63 through line 60 to the power side 59 of the piston 38 in the master cylinder 32. The quantity and pressure of the fluid admitted to the power side of the master cylinder is determined by the valves 65 and 64, respectively. It will be noted that the effective area on the power side 59 of the piston 38 is normally equal to the combined pressure areas of the said piston and the plunger 41 that serve to produce pressure in the hold down supply line 30 by reason of the fact that the first and second chambers in which the plunger and piston, respectively, slide are interconnected by the longitudinal passageway 47 and the lateral passageway 49 formed in the plunger. Thus during the initial phase of movement of the piston and plunger a relatively large volume of pressure fluid will be introduced into the hold down supply line 30 to feed all the hold down fingers into contact with the work. The total volume of pressure fluid displaced by the piston and the plunger and discharged into the supply line 30 during this initial phase is substantially greater than the volume required to move all the fingers into contact with the work thus insuring a surplus of finger feeding pressure fluid for the system. As soon as the fingers contact the work the excess fluid displaced by the piston 38 is relieved at a relatively low pressure through pipe 58 and valve 57. With the fingers in contact with the work under the maximum pressure allowed in the supply line by relief valve 57 further travel of the piston and plunger in the master cylinder causes the adjacent edge of the end portion 37 on the first chamber wall 34 to cover up and close off the mouth of the lateral passageway 49 to thereby sever communication between the first and the second chambers. Simultaneously with the closing off of passageway 49 the annular groove 52 is brought into registry with the port 51 formed in the casing wall thereby interconnecting the second chamber with the reservoir to completely reduce internal pressure in the second chamber. As the piston and plunger continue to move through the final phase of their power stroke pressure on the fingers is intensified because fluid pressure introduced through pressure line 60 can act on piston 38 unrestricted by any counterforces to give full effect of said fluid pressure on the plunger 41 in the closed space of the first chamber to thereby increase the clamping force exerted by the fingers upon the work preliminary to the cutting operation by the shear.

When the desired work clamping pressure for the fingers has been reached the pressure switch 68 (Fig. 5) will automatically close thus energizing the clutch air valve coil 71 which in turn actuates the clutch 22 to initiate the work shearing cycle of the ram 9. When the shearing cycle is complete a limit switch 74 is actuated to stop the shear and to deenergize the solenoid 67 which operates the control valve 66 to open the master cylinder side of the pipe 60 to atmosphere thus relieving all pressure on the power side of the piston 38. The force exerted by the spring 42 in the master cylinder and the combined pressure of the springs 31 in all of the hold down devices causes the piston and plunger to return to their inoperative positions shown in Fig. 3. During the first part of the return stroke the second chamber is filled with reserve oil through the registered port 51 and groove 52 and the first chamber is filled with fluid returning by supply line 30 from the hold down devices. During the last phase of return travel of the piston and plunger the passageways 47 and 49 interconnect the two chambers, with the groove 52 and port 51 being moved out of registry so that both chambers are filled with fluid from the supply line 30, any loss of fluid due to leakage in the system being replenished through check valve 54 during the last phase of return movement of the piston and plunger.

Having described the features and functions of the invention it will be readily obvious that with our system the pressures and speeds of operation of the hold down devices may be closely held within desired limits and are entirely independent of the operating cycle of the machine, initiation of the machine operation being subordinate to the completion of the work hold down operation and setting of the actuated clamps on the work.

What is claimed is:

1. In an hydraulic work clamp for squaring shears comprised of a number of single acting, spring returned piston-cylinder work hold down devices each having its actuating side connected to a common fluid pressure supply line, a fluid pump having a first chamber formed by a cylinder and plunger and communicating with the supply line, and a second chamber formed by a cylinder and piston normally in communication with said supply line, the said piston and plunger being connected together and the piston in the second chamber having an effective area larger than the effective area of the plunger in the first chamber, a pressure relief valve for the second chamber, power means for moving the piston and the plunger, and valve means operative during continued movement of the piston and the plunger for cutting off communication between the second chamber and the supply line.

2. In an hydraulic work clamp for squaring shears comprised of a number of single acting, spring returned piston-cylinder work hold down devices each having its actuating side connected to a common fluid pressure supply line, a fluid pump having a first chamber formed by a cylinder and piston and communicating with the supply line, and a second chamber formed by a cylinder and plunger normally in communication with said supply line, the said piston and plunger being connected together and the piston in the second chamber having an effective area larger than the effective area of the plunger in the first chamber, a pressure relief valve for the second chamber, a source of fluid under pressure, conduit means connecting the source to the power side of the piston in the second chamber, and normally inactive valve means made operative by the continued movement of the piston and the plunger for cutting off communication between the second chamber and the supply line.

3. In an hydraulic work clamp for squaring shears comprised of a number of single acting, spring returned piston-cylinder work hold down devices each having its actuating side connected to a common fluid pressure supply line, a single acting master cylinder for supplying actuating fluid through the supply line to the devices, said cylinder having a first chamber and a coaxially positioned second chamber having a relatively larger diameter than the first chamber, a piston arranged to slide in the second chamber, power means connected to said piston, a plunger fixed coaxially on the piston and extending into and slidable in the first chamber, conduit means connecting the first chamber to the supply line, a relief valve for the second chamber, a passageway formed in the plunger and normally interconnecting the first and second chambers, and fixed means in the cylinder for closing the passageway during continued movement of the piston and plunger by the power means.

4. In a hydraulic work clamp for squaring shears comprised of a number of single spring returned piston-cylinder work hold down devices, each having its actuating side connected to a common fluid pressure supply line, a single acting, master cylinder for supplying actuating fluid through the supply line to the devices, said cylinder having a first chamber and a coaxially positioned second chamber having a relatively larger diameter than the said first chamber, a piston arranged to slide in the second chamber, cooperative pressure relief ports formed in the cylinder and in the piston and normally in inoperative, non-registered positions, power means connected to said piston, a plunger fixed coaxially on the piston and extending into and slidable in the first chamber, conduit means connecting the first chamber to the supply line, a passageway formed in the plunger and normally interconnecting the first and the second chambers, and fixed cut off means on the cylinder for closing the passageway simultaneously with registry of the cooperative pressure relief ports during continued movement of the piston and the plunger by the power means.

5. An hydraulic work clamp for squaring shears as set forth in claim 4 characterized by the fact that the power means is a source of fluid pressure in communication with the power side of the piston in the second chamber.

6. An hydraulic work clamp for squaring shears as set forth in claim 4 characterized by the fact that the fixed cut off means comprises the adjacent edge portion of the cylinder wall forming the first chamber in which the plunger slides, and the terminal end of said passageway that normally opens out from the plunger into the second chamber.

7. In an hydraulic work clamp for squaring shears comprised of a number of single acting spring returned piston-cylinder work hold down devices, each having its actuating side connected to a common fluid pressure supply line, a single acting, master cylinder for supplying actuating fluid through the supply line to the devices, said cylinder having a first chamber wall and a coaxially positioned second chamber wall, said second chamber wall having a relatively larger diameter than said first chamber wall, a piston arranged to slide within the second chamber wall, said piston having a lateral head portion and an annular skirt extending from one side of the head, a relief port formed in the chamber wall and normally covered by the skirt portion, a port formed in the skirt normally out of registry with the port in the chamber wall, power means connected to the side if the head portion of the piston opposed to the skirt portion, a plunger fixed on the piston head coaxially with the skirt portion and extending into and slidable within the first chamber wall, conduit means connecting the first chamber to the supply line, a passageway formed longitudinally in the plunger and in open communication with the first chamber, a lateral passageway formed through an intermediate portion of the plunger in communication with the longitudinal passageway and normally in open communication with the second chamber, power means connected to the side of the head portion of the piston opposed to its skirt portion for moving the piston and plunger to simultaneously bring the relief ports into registry and cover the lateral passageway with the adjacent portion of the first chamber wall.

8. In the hydraulic work clamp for squaring shears as set forth in claim 7 characterized by the fact that the second chamber is at all times connected to a pressure relief valve.

9. In the hydraulic work clamp for squaring shears as set forth in claim 7 characterized by the fact that the first chamber has a free intake, pressure ball check valve connected thereto at all times.

10. In a fluid pressure system for squaring shears the combination of a frame, a reciprocated ram on the frame, a work supporting bed positioned on the frame, power means for reciprocating the ram, a clutch interposed between the power means and the ram, a number of single acting, spring returned piston-cylinder work hold down devices on the frame above the bed and each having its actuating side connected to a common fluid pressure supply line, a fluid pump having a first chamber formed by a cylinder and plunger and communicating with the supply line, and a second chamber formed by a cylinder and piston and normally in communication with said supply line, the said piston and plunger being connected together and the piston in the second chamber having an effective pressure area larger than the effective pressure area of the plunger in the first chamber, a source of fluid pressure, a pressure line connecting the source to the power side of the piston in the second chamber, manually operable control means in the pressure line, a pressure responsive switch in the pressure supply line for the devices, means for operatively connecting the pressure responsive switch to the clutch to render the latter operative, a pressure relief valve for the second chamber set to operate at a relief pressure relatively less than the actuating pressure of the pressure responsive switch, and valve means operated by continued movement of the piston and the plunger for cutting off communication between the second chamber and the supply line.

11. In a fluid pressure system for squaring shears the combination of a frame, a reciprocated ram on the frame, a work supporting bed positioned on the frame, power means for reciprocating the ram, a clutch interposed between the power means and the ram, a number of single acting, spring returned piston-cylinder work hold down devices on the frame above the bed and each having its actuating side connected to a common fluid pressure supply line, a fluid pump having a first chamber wall and a coaxially positioned second chamber wall, said second chamber wall having a relatively larger diameter than said first chamber wall, a piston arranged to slide within the second chamber and having a lateral head portion and an annular skirt extending from one side of the head, a pair of relief ports formed one in the second chamber wall and one in the piston skirt, said ports being axially separated by a distance equal to the pressure producing work stroke of the piston, a source of fluid under pressure, a connection between the source and the side of the piston head opposed to the skirt, an independent control means in said connection, a plunger fixed on the piston coaxially within the skirt portion and extending into and slidable within the first chamber wall, conduit means connecting the first chamber to the supply line, a passageway formed longitudinally in the plunger and in open communication with the first chamber, a lateral passageway formed through an intermediate portion of the plunger and communicating with the longitudinal passageway, said lateral passageway being normally in communication with the second chamber and closed by the first wall portion when the pair of relief ports are brought into registry, a pressure responsive switch in the supply line, means for operatively connecting the switch with the clutch to actuate the latter, and a pressure relief valve connected to the second chamber set to open at a pressure relatively less than the actuating pressure of the pressure responsive switch.

References Cited in the file of this patent
UNITED STATES PATENTS

| | | |
|---|---|---|
| 1,881,185 | Hazelton | Nov. 23, 1929 |
| 2,580,851 | Seppman | Jan. 1, 1952 |